US010885161B2

(12) United States Patent
Satoh

(10) Patent No.: US 10,885,161 B2
(45) Date of Patent: Jan. 5, 2021

(54) INFORMATION PROCESSING APPARATUS, INFORMATION PROCESSING METHOD, AND COMPUTER PROGRAM

(71) Applicant: Yoshimi Satoh, Tokyo (JP)

(72) Inventor: Yoshimi Satoh, Tokyo (JP)

(73) Assignee: RICOH COMPANY, LTD., Tokyo (JP)

(*) Notice: Subject to any disclaimer, the term of this patent is extended or adjusted under 35 U.S.C. 154(b) by 163 days.

(21) Appl. No.: 15/567,101

(22) PCT Filed: May 19, 2016

(86) PCT No.: PCT/JP2016/002454
§ 371 (c)(1),
(2) Date: Oct. 17, 2017

(87) PCT Pub. No.: WO2016/185725
PCT Pub. Date: Nov. 24, 2016

(65) Prior Publication Data
US 2018/0101668 A1 Apr. 12, 2018

(30) Foreign Application Priority Data
May 19, 2015 (JP) ................. 2015-101751

(51) Int. Cl.
G06F 21/31 (2013.01)
G06F 9/451 (2018.01)
(Continued)

(52) U.S. Cl.
CPC ............ *G06F 21/31* (2013.01); *B41J 29/393* (2013.01); *G06F 9/451* (2018.02); *G06F 21/12* (2013.01);
(Continued)

(58) Field of Classification Search
None
See application file for complete search history.

(56) References Cited

U.S. PATENT DOCUMENTS

2002/0144257 A1 10/2002 Matsushima
2006/0203279 A1 9/2006 Kinoshita
(Continued)

FOREIGN PATENT DOCUMENTS

JP 2007-053555 3/2007
JP 2010-015533 1/2010
(Continued)

OTHER PUBLICATIONS

Zhu et al., Print Signatures for Document Authentication, 2003, CCS'03, Oct. 27-31, 2003, pp. 145-154 (Year: 2003).*
(Continued)

*Primary Examiner* — Luu T Pham
*Assistant Examiner* — Edward X Long
(74) *Attorney, Agent, or Firm* — Harness, Dickey & Pierce, P.L.C.

(57) ABSTRACT

An information processing apparatus includes an authenticating unit, an acquiring unit, a first specifying unit, and a first display unit. The authenticating unit, when accepting first user information used for authentication of determining whether a user has an authority, compares the first user information and second user information identifying a user having the authority. The acquiring unit acquires an application list screen, in which each of applications is associated with display information, in accordance with an operation performed by the authenticated user. The first specifying unit, when the acquiring unit acquires the application list screen, specifies authority information corresponding to the second user information identifying the authenticated user, based on first information indicating a correspondence relation between the second user information and the authority information. The first display unit changes a display content of the application list screen and displays the changed
(Continued)

content in accordance with the specified authority information.

11 Claims, 15 Drawing Sheets

(51) Int. Cl.
| | |
|---|---|
| G06F 21/60 | (2013.01) |
| H04L 29/06 | (2006.01) |
| G06F 21/12 | (2013.01) |
| B41J 29/393 | (2006.01) |
| H04N 1/00 | (2006.01) |
| H04N 1/44 | (2006.01) |
| H04L 29/08 | (2006.01) |

(52) U.S. Cl.
CPC .......... *G06F 21/121* (2013.01); *G06F 21/608* (2013.01); *H04L 63/102* (2013.01); *H04N 1/00411* (2013.01); *H04N 1/4413* (2013.01); *G06F 2221/2141* (2013.01); *H04L 67/306* (2013.01); *H04N 2201/0094* (2013.01)

(56) References Cited

U.S. PATENT DOCUMENTS

| | | |
|---|---|---|
| 2010/0305912 A1 | 12/2010 | Viassolo et al. |
| 2011/0202433 A1 | 8/2011 | Yokoyama |
| 2011/0252415 A1* | 10/2011 | Ricci ...................... G06Q 10/06 717/173 |
| 2011/0276960 A1 | 11/2011 | Nakamoto |
| 2014/0082747 A1 | 3/2014 | Negoro et al. |
| 2014/0189675 A1* | 7/2014 | Cheng ...................... G06F 8/62 717/170 |
| 2014/0380462 A1* | 12/2014 | Hosoda ................. G06F 21/608 726/17 |
| 2015/0012838 A1* | 1/2015 | Hegstad ............. G06F 11/3688 715/745 |
| 2015/0294105 A1* | 10/2015 | Baricuatro, Jr. ........ G06F 21/44 726/17 |

FOREIGN PATENT DOCUMENTS

| | | |
|---|---|---|
| JP | 2010-277577 | 12/2010 |
| JP | 2011-170464 | 9/2011 |
| JP | 2011-237881 | 11/2011 |

OTHER PUBLICATIONS

Cui et al., When Firmware Modifications Attack: A Case Study of Embedded Exploitation, 2013, pp. 1-13 (Year: 2013).*
Extended European Search Report dated Jan. 19, 2018.
International Search Report dated Jul. 19, 2016 in PCT/JP2016/002454 filed on May 19, 2016.

* cited by examiner

[Fig. 1]
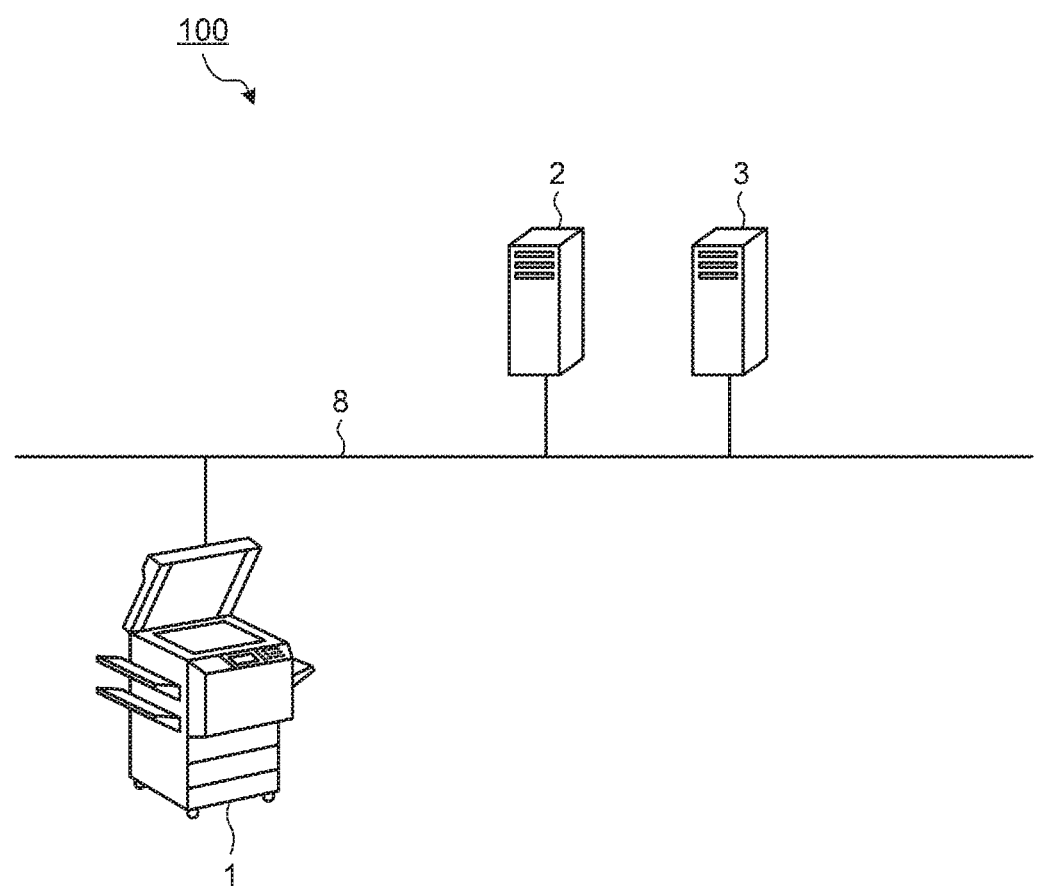

[Fig. 2]
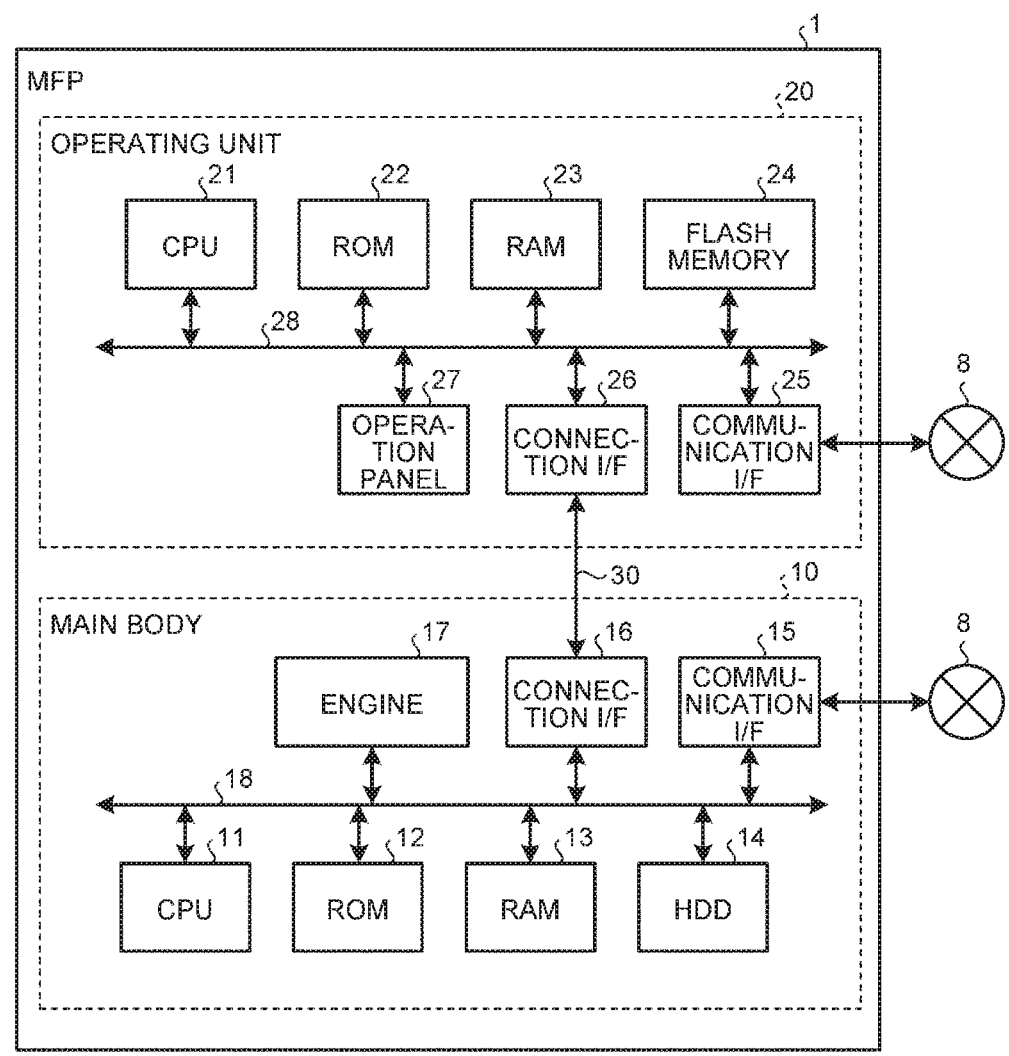

[Fig. 3]
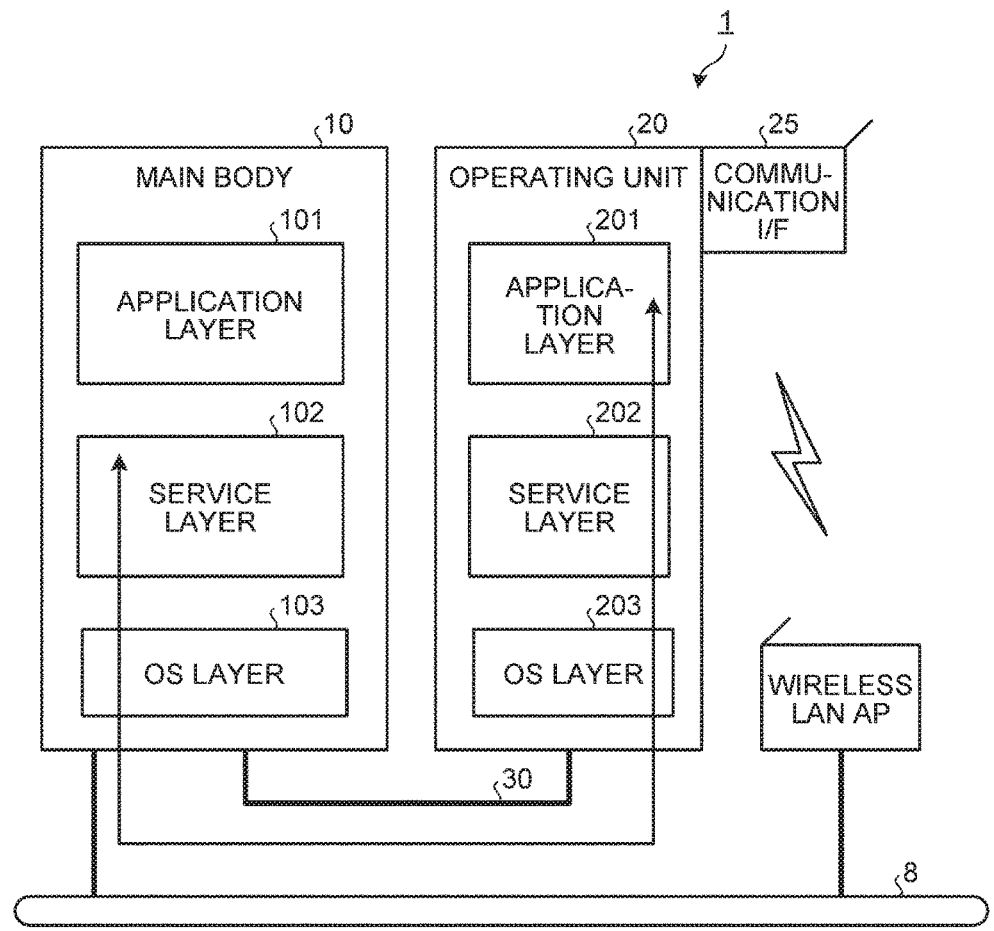
[Fig. 4]
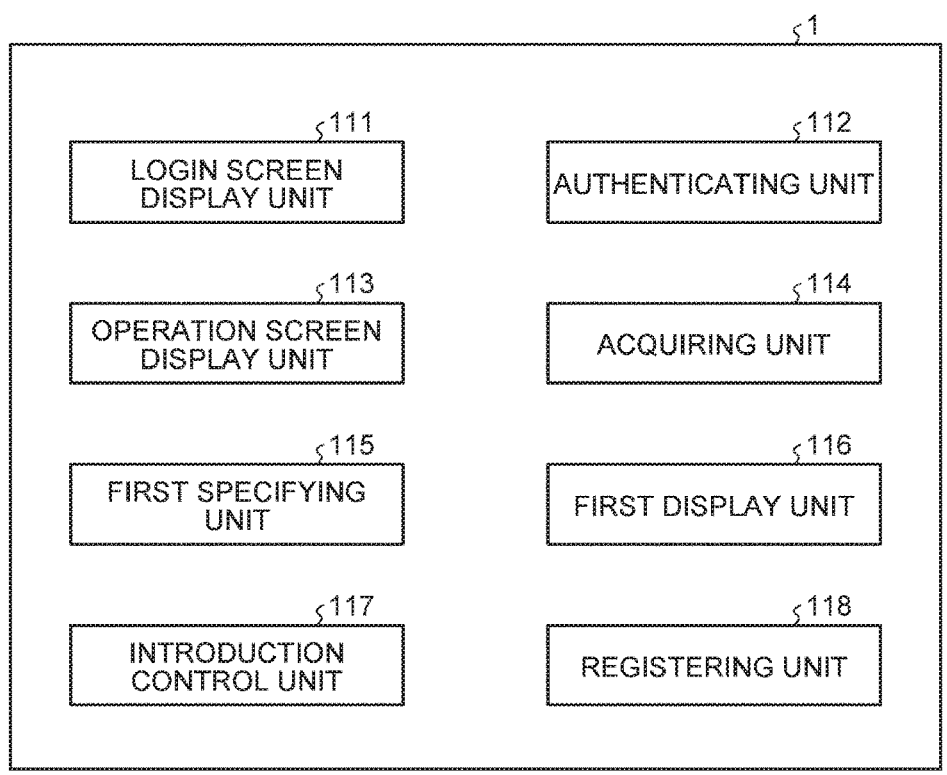

[Fig. 5]

| ITEM | VALUE |
| --- | --- |
| ENTRY ID | 001 |
| USER ID | Admin |
| PASSWORD | dkc38wgp |
| ... | ... |
| BELONGING GROUP | DEVICE ADMINISTRATOR GROUP |
| | USER ADMINISTRATOR GROUP |

[Fig. 6]

| ITEM | VALUE |
| --- | --- |
| DEVICE ADMINISTRATOR FUNCTION SETTING | ENABLED |
| USER ADMINISTRATOR FUNCTION SETTING | ENABLED |
| DOCUMENT ADMINISTRATOR FUNCTION SETTING | ENABLED |
| NETWORK ADMINISTRATOR FUNCTION SETTING | DISABLED |
| ... | ... |
| SERVICE FUNCTION SETTING | ENABLED |
| ... | ... |

[Fig. 7]

| FUNCTION | AUTHORITY |
| --- | --- |
| DEVICE ADMINISTRATOR FUNCTION | INSTALLATION AUTHORITY, ... |
| USER ADMINISTRATOR FUNCTION | ADDRESS BOOK EDIT AUTHORITY, FUNCTION RESTRICTION SETTING AUTHORITY, AUTHENTICATION SETTING AUTHORITY, ... |
| ⋮ | ⋮ |

[Fig. 8]
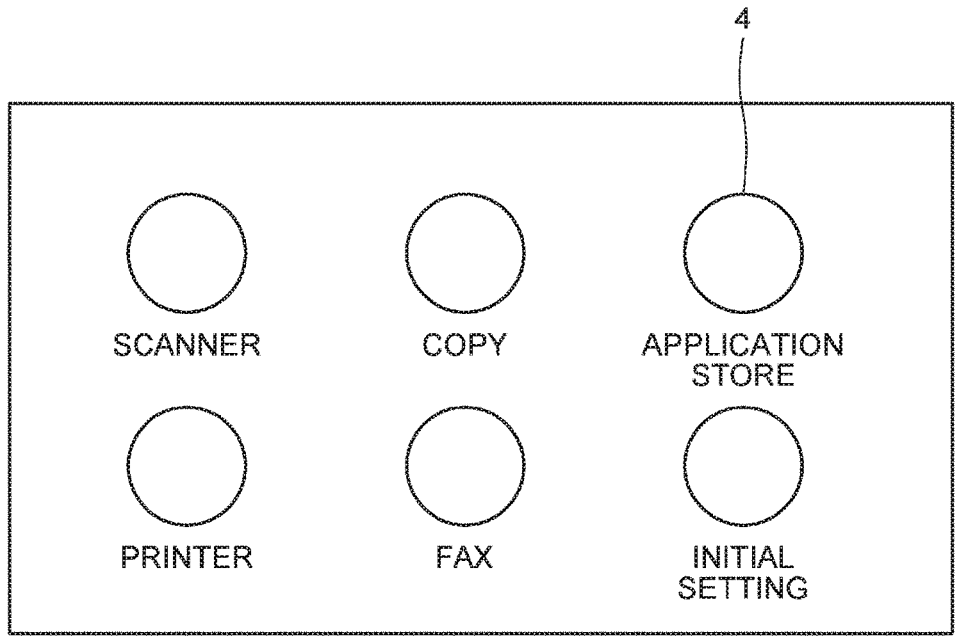
[Fig. 9]
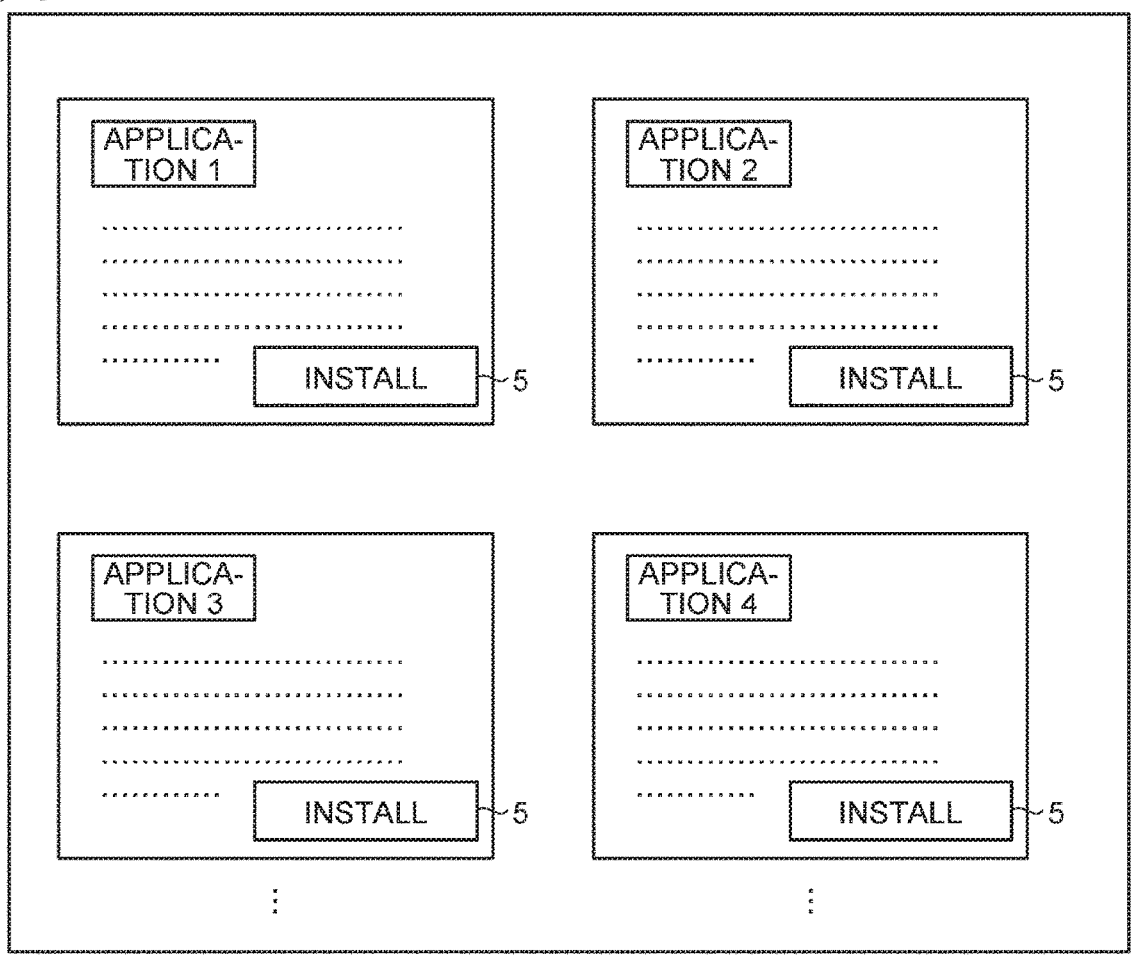
[Fig. 10]

[Fig. 11]

| ITEM | VALUE |
|---|---|
| ENTRY ID | 001 |
| USER ID | Admin |
| PASSWORD | dkc38wgp |
| ... | ... |
| BELONGING GROUP | DEVICE ADMINISTRATOR GROUP |

[Fig. 12]

| FUNCTION | RESTRICTION INFORMATION |
|---|---|
| DEVICE ADMINISTRATOR FUNCTION | RESTRICTED |
| USER ADMINISTRATOR FUNCTION | UNRESTRICTED |
| DOCUMENT ADMINISTRATOR FUNCTION | UNRESTRICTED |
| NETWORK ADMINISTRATOR FUNCTION | UNRESTRICTED |
| ... | ... |
| SERVICE FUNCTION | UNRESTRICTED |
| ... | ... |

[Fig. 13]
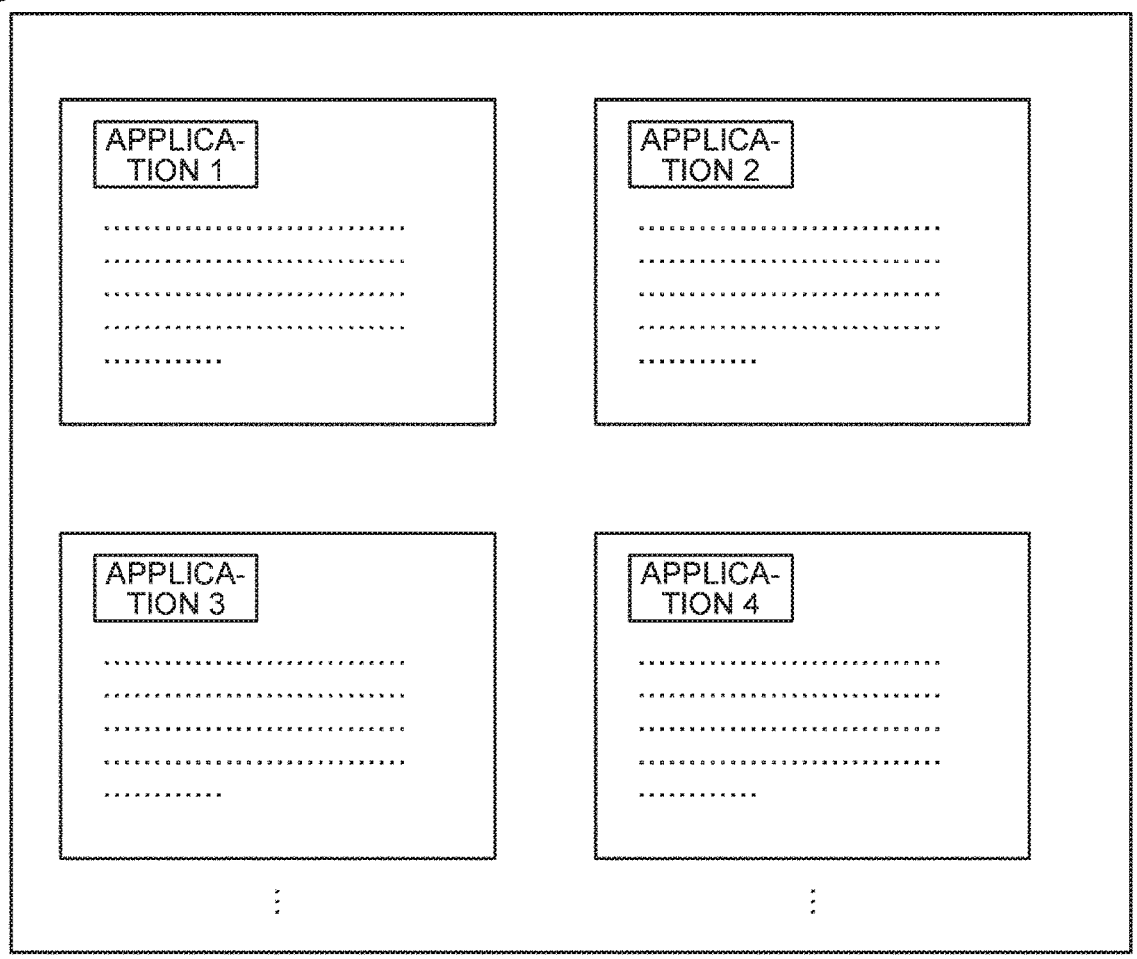

[Fig. 14]
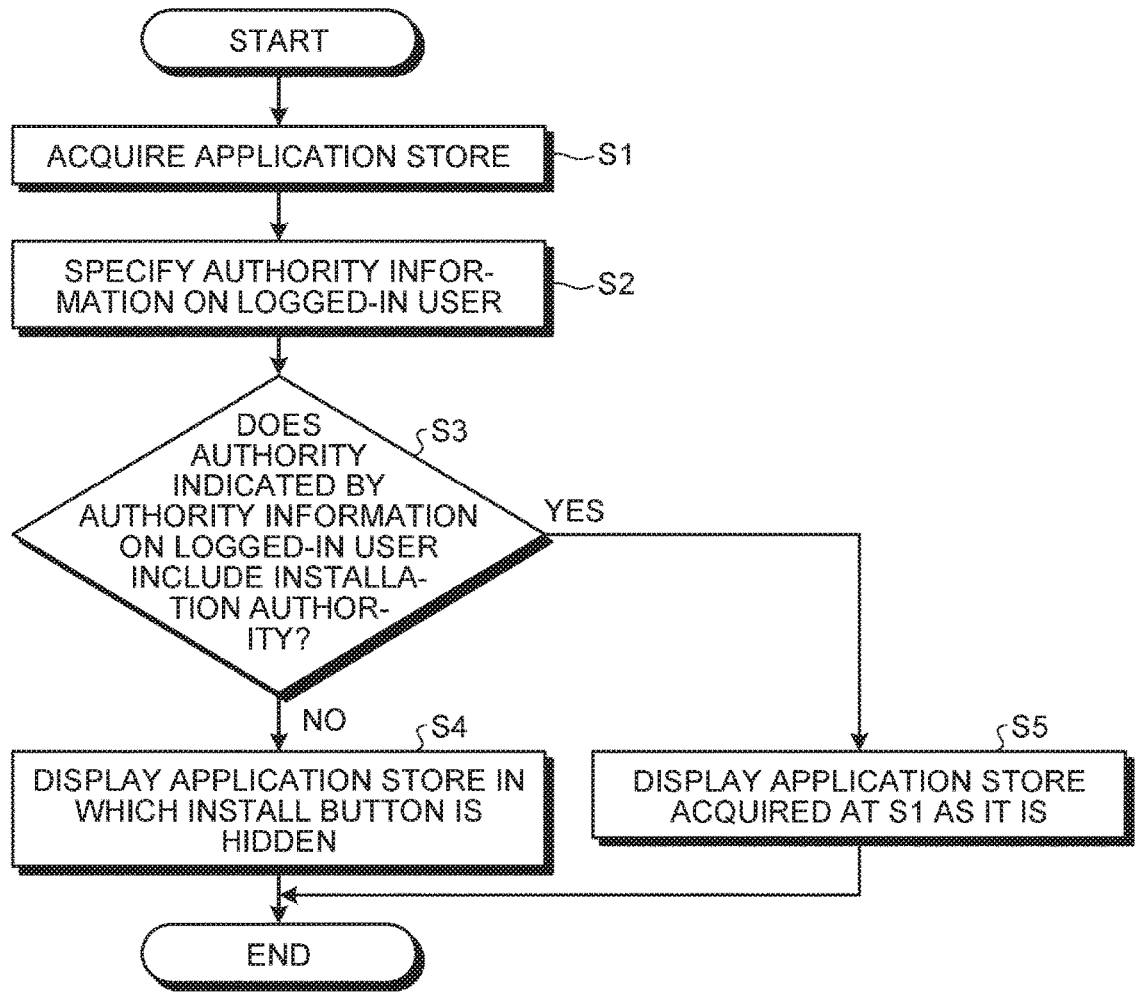
[Fig. 15]
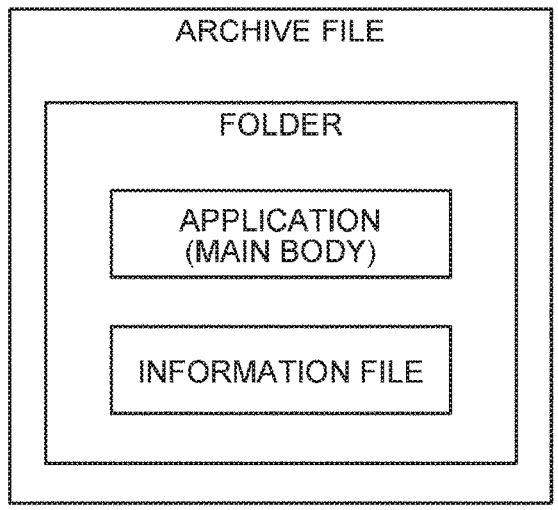

[Fig. 16]
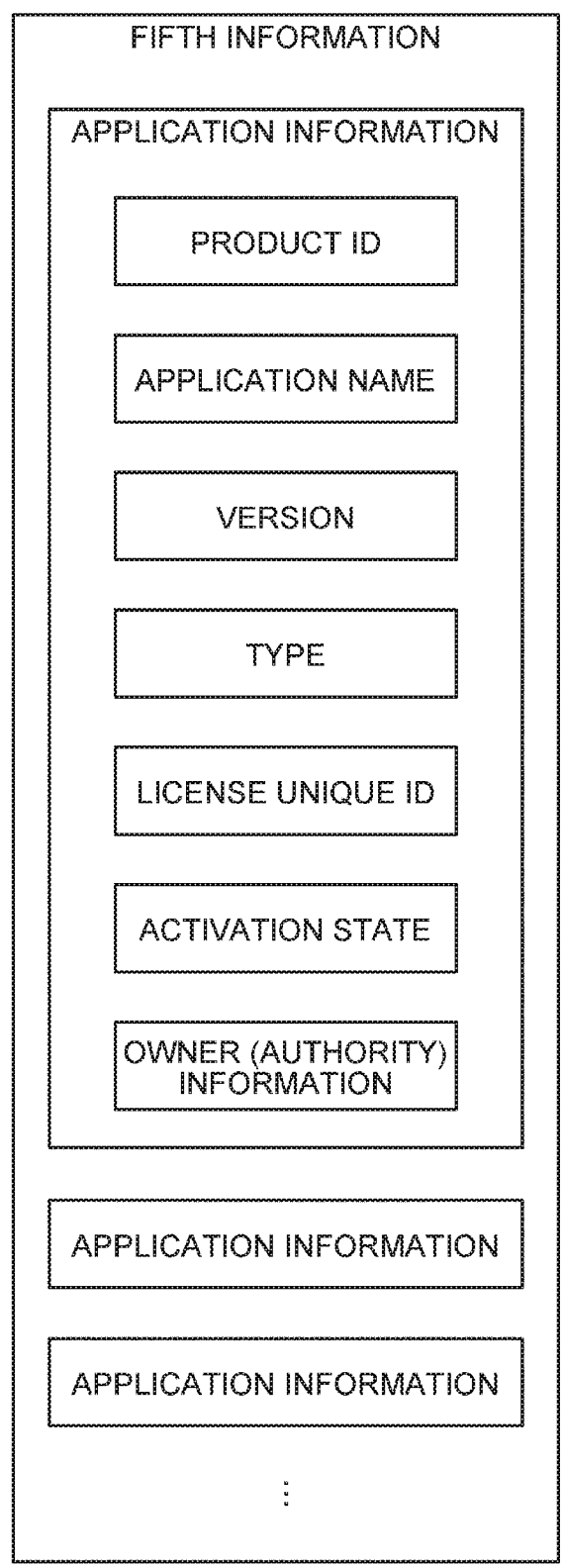

[Fig. 17]
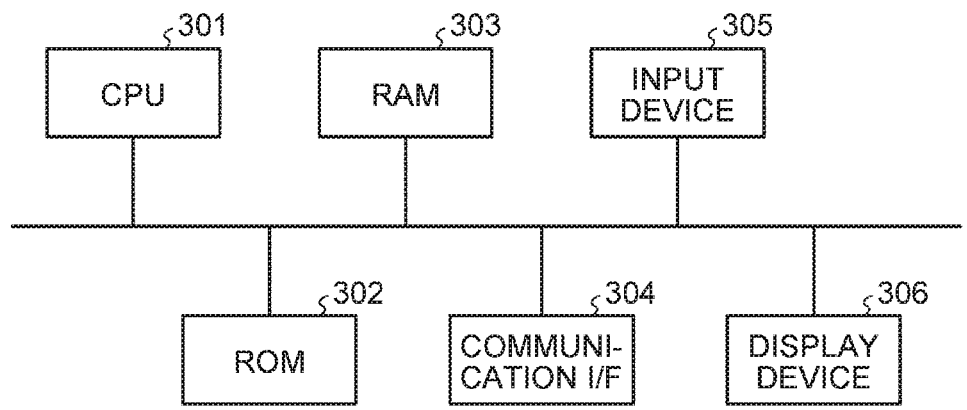
[Fig. 18]
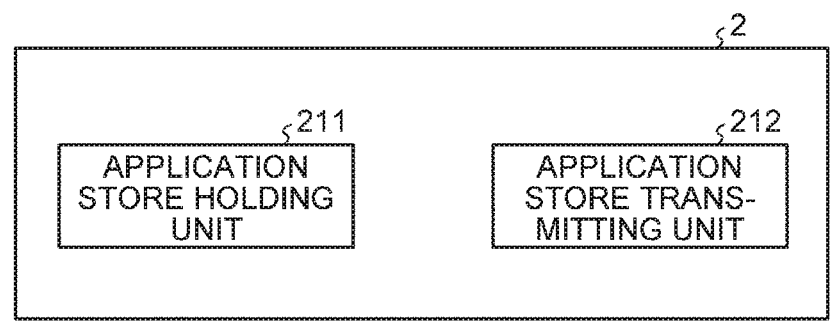
[Fig. 19]
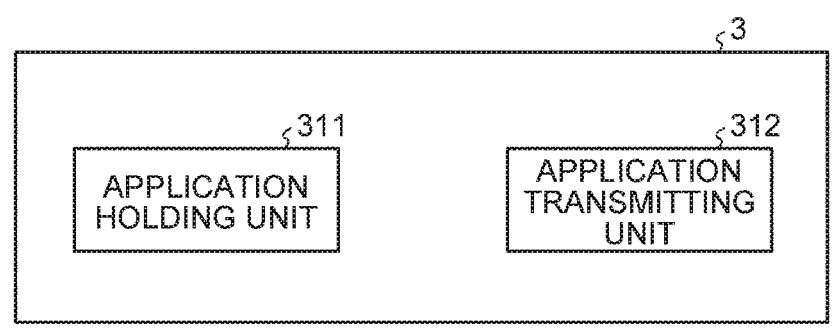

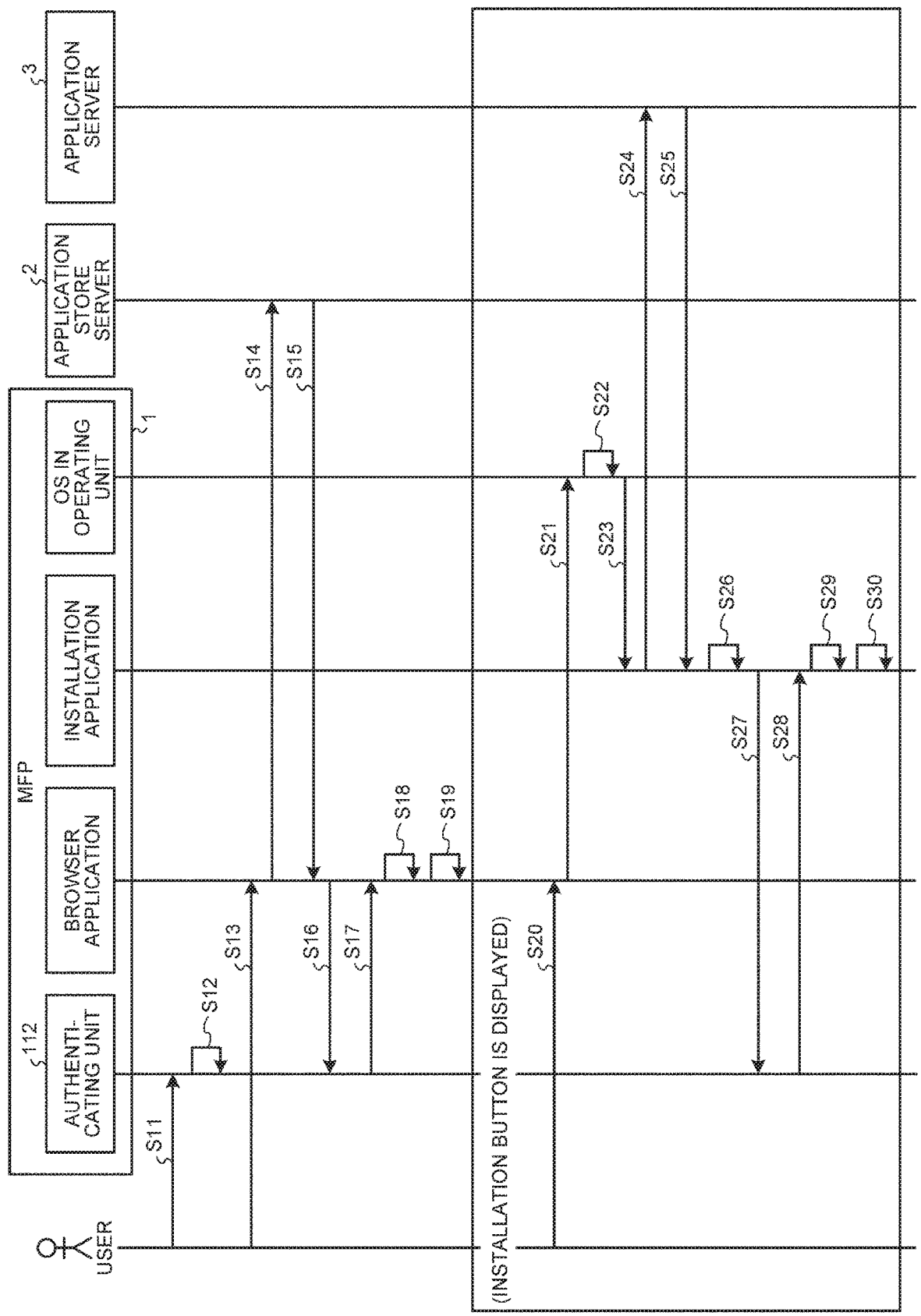
[Fig. 20]

[Fig. 21]
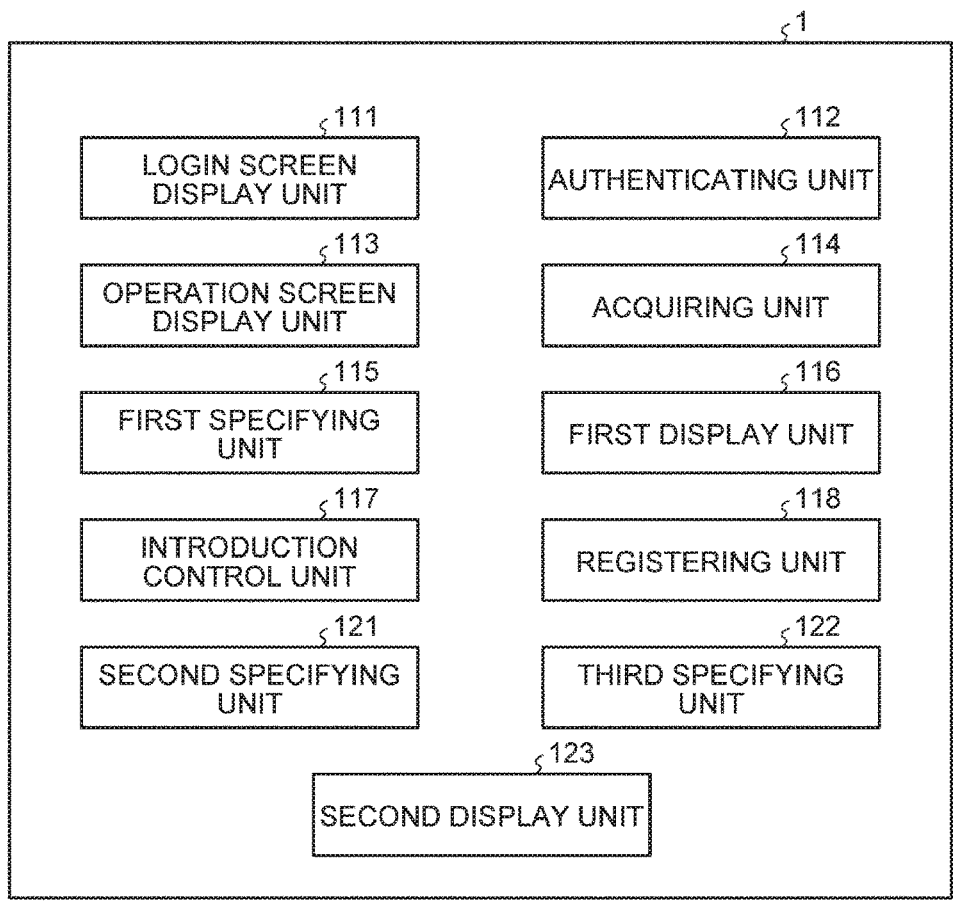
[Fig. 22]

[Fig. 23]
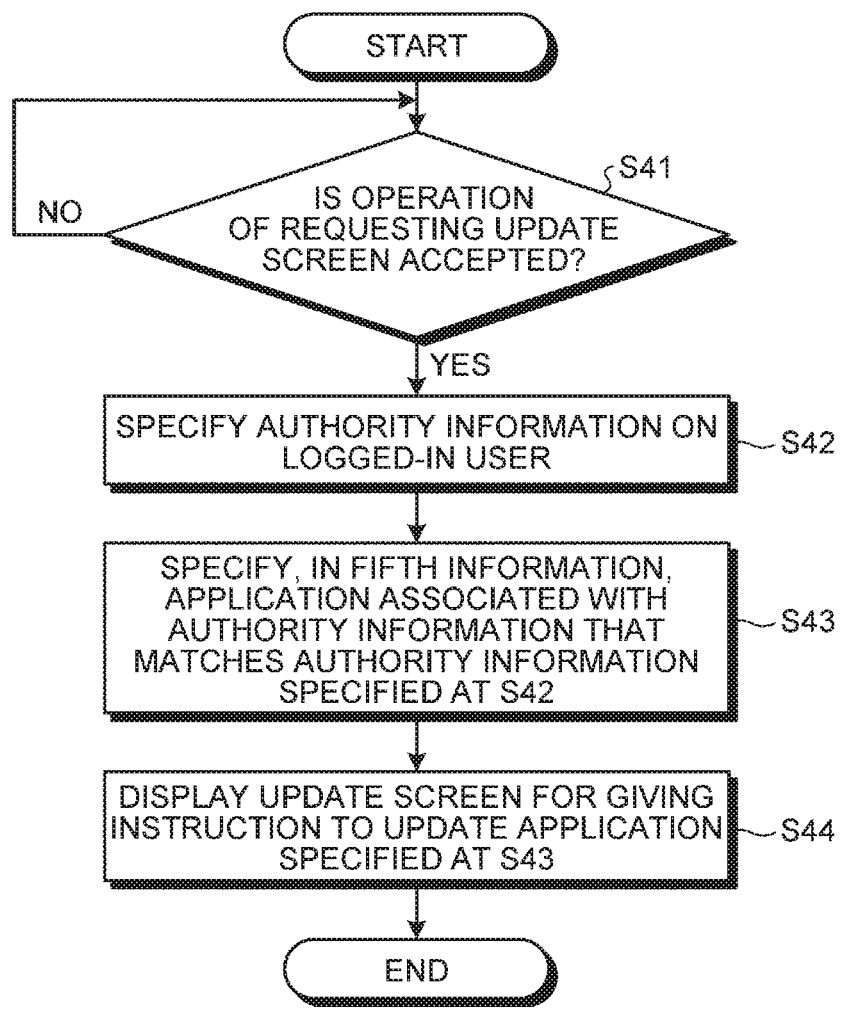

[Fig. 24]
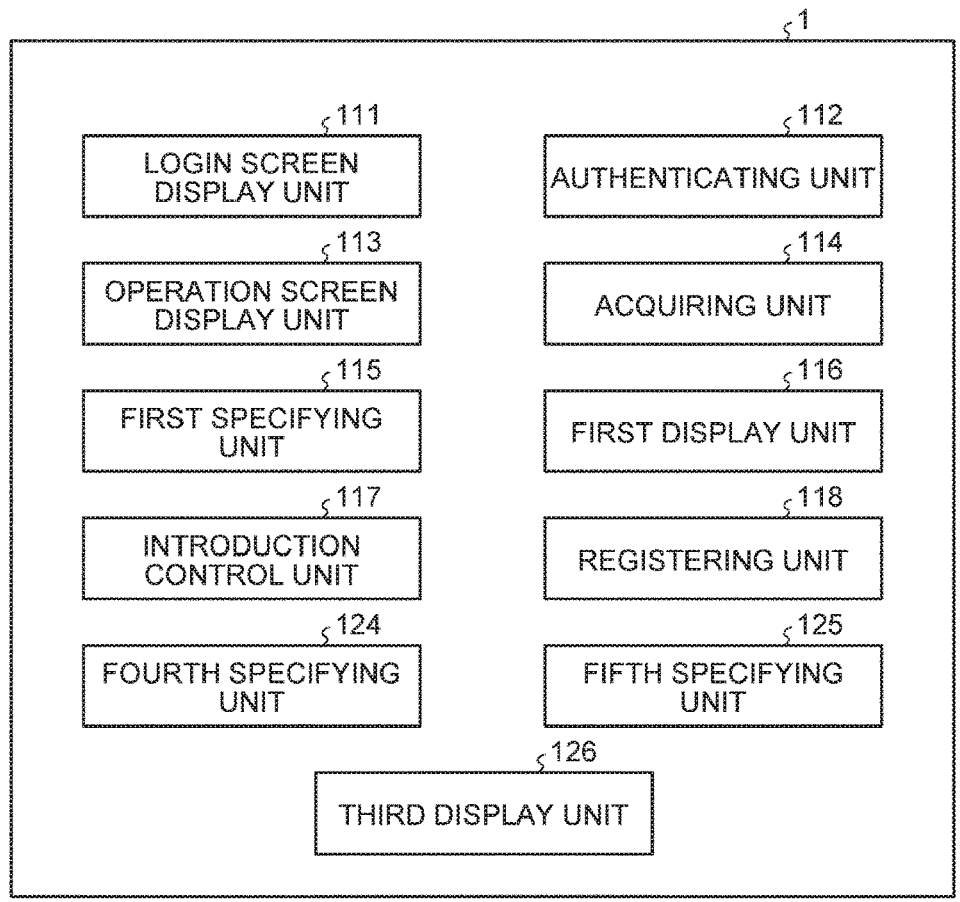
[Fig. 25]
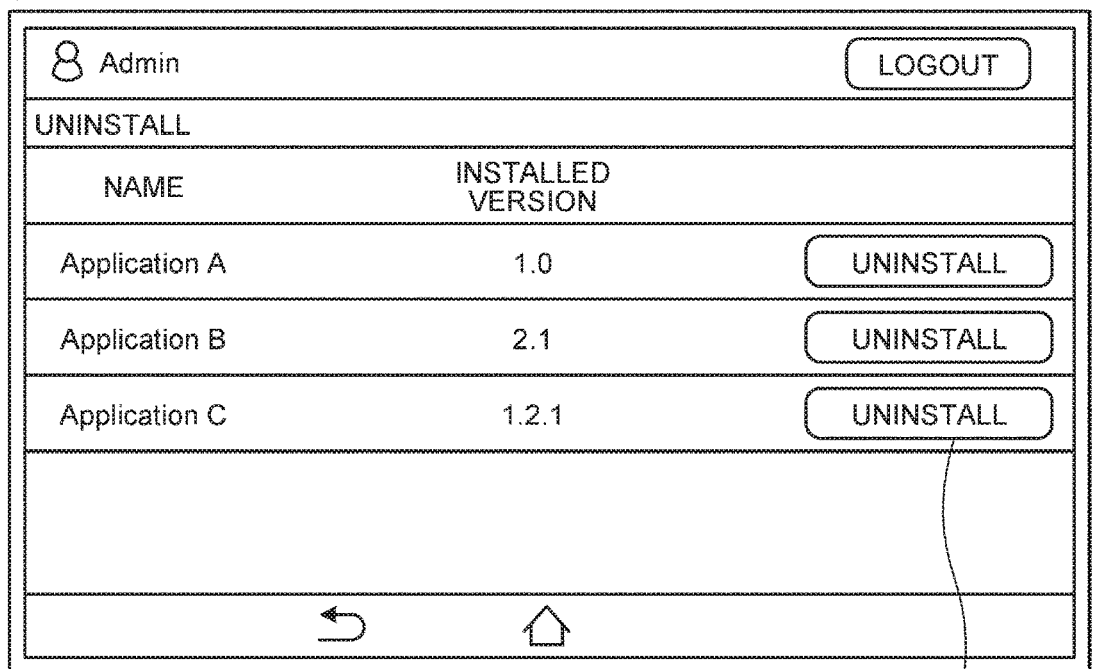

[Fig. 26]
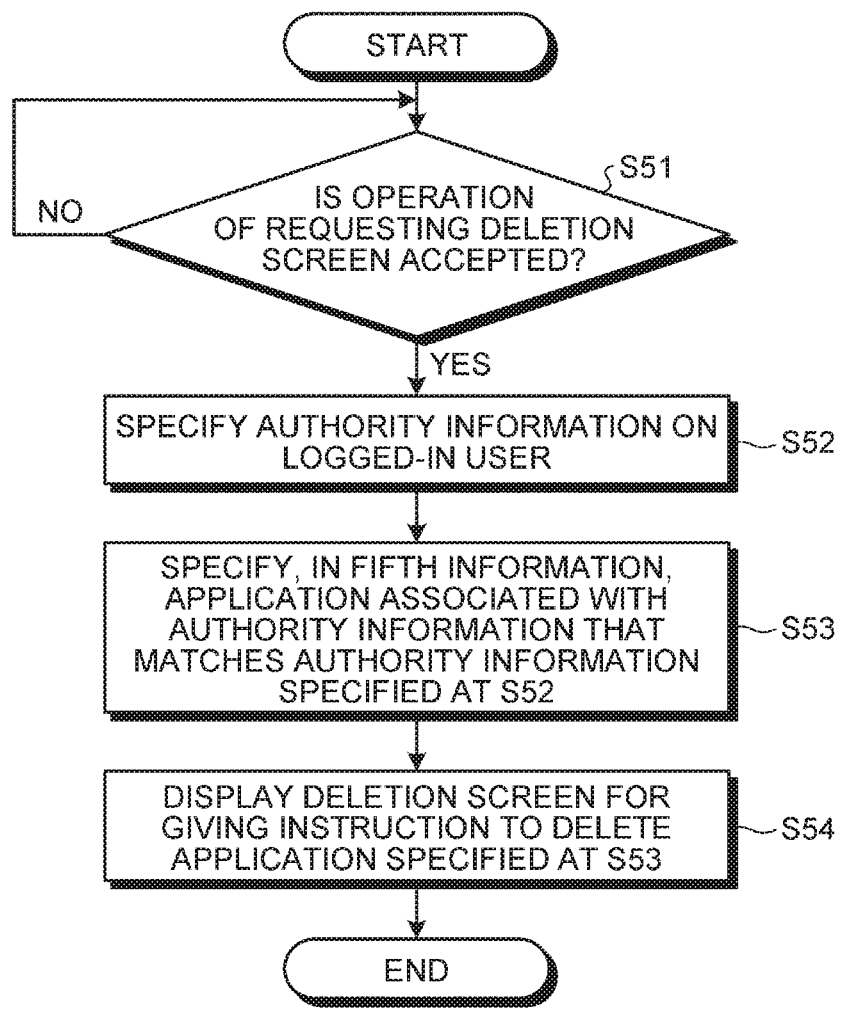

INFORMATION PROCESSING APPARATUS, INFORMATION PROCESSING METHOD, AND COMPUTER PROGRAM

TECHNICAL FIELD

The present invention relates to information processing apparatuses, information processing methods, and computer programs.

BACKGROUND ART

There has been known a system for downloading and installing an application from a web page provided by a web server.

For example, Japanese Unexamined Patent Application Publication No. 2011-237881 discloses that a multifunction peripheral (MFP) downloads software in conjunction with a distribution server that distributes the software, and installs the downloaded software.

SUMMARY OF INVENTION

Technical Problem

However, in the technology disclosed in Japanese Unexamined Patent Application Publication No. 2011-237881, it is difficult to change a display content of a screen for introducing (installing) an application in an apparatus in accordance with the authority of a user, so that the convenience of the user is low.

The present invention has an object to provide an information processing apparatus that is capable of improving the convenience of a user.

Solution to Problem

According to one aspect of the present invention, an information processing apparatus includes an authenticating unit, an acquiring unit, a first specifying unit, and a first display unit. The authenticating unit, when accepting first user information used for authentication of determining whether a user has an authority to use the information processing apparatus, compares the first user information and second user information identifying a user who has the authority to use the information processing apparatus so as to perform the authentication. The acquiring unit acquires an application list screen, in which each of applications is associated with display information for giving an instruction to introduce the application in the information processing apparatus, in accordance with an operation performed by the user authenticated by the authenticating unit. The first specifying unit, when the acquiring unit acquires the application list screen, specifies authority information corresponding to the second user information identifying the user authenticated by the authenticating unit, based on first information indicating a correspondence relation between the second user information and the authority information. The first display unit changes a display content of the application list screen and displays the changed content in accordance with the authority information specified by the first specifying unit.

Advantageous Effects of Invention

According to one aspect of the present invention, it is possible to improve the convenience of a user.

BRIEF DESCRIPTION OF DRAWINGS

FIG. 1 is a diagram illustrating an example of an overall configuration of an information processing system.

FIG. 2 is a diagram illustrating an example of a hardware configuration of an MFP.

FIG. 3 is a diagram illustrating an example of a software configuration of the MFP.

FIG. 4 is a diagram illustrating an example of functions included in the MFP of a first embodiment.

FIG. 5 is a diagram illustrating an example of entry information.

FIG. 6 is a diagram illustrating an example of third information.

FIG. 7 is a diagram illustrating an example of fourth information.

FIG. 8 is a diagram illustrating an example of an operation screen.

FIG. 9 is a diagram illustrating an example of an application store.

FIG. 10 is a diagram illustrating an example of an installation command.

FIG. 11 is a diagram illustrating an example of the entry information.

FIG. 12 is a diagram illustrating an example of function restriction information.

FIG. 13 is a diagram illustrating an example of a display mode of the application store.

FIG. 14 is a flowchart illustrating an example of an operation performed by the MFP of the first embodiment.

FIG. 15 is a diagram illustrating an example of an archive file of an application.

FIG. 16 is a diagram illustrating an example of fifth information.

FIG. 17 is a diagram illustrating an example of a hardware configuration of an application store server and an application server.

FIG. 18 is a diagram illustrating an example of functions included in the application store server.

FIG. 19 is a diagram illustrating an example of functions included in the application server.

FIG. 20 is a sequence diagram illustrating an example of the flow of an operation performed by the information processing system of the first embodiment.

FIG. 21 is a diagram illustrating an example of functions included in an MFP of a second embodiment.

FIG. 22 is a diagram illustrating an example of an update screen.

FIG. 23 is a flowchart illustrating an example of an operation performed by the MFP of the second embodiment.

FIG. 24 is a diagram illustrating an example of functions included in an MFP of a third embodiment.

FIG. 25 is a diagram illustrating an example of a deletion screen.

FIG. 26 is a flowchart illustrating an example of an operation performed by the MFP of the third embodiment.

DESCRIPTION OF EMBODIMENTS

Exemplary embodiments of an information processing apparatus, an information processing method, and a computer program according to the present invention will be described in detail below with reference to the accompanying drawings. In the following, a multifunction peripheral (MFP) that is an embodiment of an image forming apparatus will be described as an example of the information processing apparatus according to the present invention; however, it is not limited thereto. The MFP is a device having a plurality of different functions, such as a copy function, a scanner function, a printer function, and a facsimile function.

First Embodiment

FIG. 1 is a diagram illustrating an example of an overall configuration of an information processing system 100 of a first embodiment. As illustrated in FIG. 1, the information processing system 100 includes an MFP 1, an application store server 2, and an application server 3, which are coupled to one another via a network 8.

The application store server 2 provides the MFP 1 with an application list screen (may be referred to as an "application store" in the following descriptions), in which each of applications is associated with display information (in this example, a button) for giving an instruction to implement (install) the application. Details will be described in detail later. In this example, an application (hereinafter, may be referred to as a "store application") that provides a function to acquire the application store from the application store server 2 and display the application store on the MFP 1, or an application (hereinafter, may be referred to as an "installation application") that provides a function to install, in the MFP 1, an application selected by a user from among the applications displayed in the application store is installed in the MFP 1 in advance. Incidentally, functions of the store application are implemented by using an application for providing a function of a web browser, and therefore, the store application may be referred to as a "browser application". Details of the MFP 1 will be described in detail later.

The application server 3 holds applications displayed in the application list screen, and distributes an application in response to a request from the MFP 1. Details will be described in detail later.

A hardware configuration of the MFP 1 will be described below with reference to FIG. 2. As illustrated in FIG. 2, the MFP 1 includes a main body 10 capable of implementing various functions, such as a copy function, a scanner function, a facsimile function, and a printer function, and an operating unit 20 that accepts an operation from a user. Incidentally, a concept of accepting an operation from a user includes accepting information (including a signal or the like indicating a coordinate value on a screen) that is input in accordance with the operation of the user. The main body 10 and the operating unit 20 are coupled to each other so as to be able to communicate with each other via a special communication channel 30. As the communication channel 30, for example, a channel compliant with a universal serial bus (USB) standard may be used, or a channel compliant with an arbitrary standard may be used regardless of whether it is wired or wireless.

The main body 10 can perform an operation in accordance with the operation accepted by the operating unit 20. Furthermore, the main body 10 can communicate with an external apparatus, such as a client personal computer (PC), and can perform an operation in accordance with an instruction received from the external apparatus.

First, a hardware configuration of the main body 10 will be described. As illustrated in FIG. 2, the main body 10 includes a central processing unit (CPU) 11, a read only memory (ROM) 12, a random access memory (RAM) 13, a hard disk drive (HDD) 14, a communication interface (I/F) 15, a connection I/F 16, and an engine 17, all of which are coupled to one another via a system bus 18.

The CPU 11 integrally controls operations performed by the main body 10. The CPU 11 executes a program stored in the ROM 12, the HDD 14, or the like by using the RAM 13 as a work area (workspace), to thereby control the entire operation of the main body 10 and implement the above-described various functions, such as the copy function, the scanner function, the facsimile function, and the printer function.

The communication I/F 15 is an interface for connecting to the network 8. The connection I/F 16 is an interface for communicating with the operating unit 20 via the communication channel 30.

The engine 17 is hardware that performs processing, other than general information processing and communication, to implement the copy function, the scanner function, the facsimile function, and the printer function. For example, a scanner (image reading unit) that scans an image of a document to read the image, a plotter (image forming unit) that performs printing on a sheet material, such as a sheet, or a facsimile unit that performs facsimile communication, and the like are provided. Furthermore, it may be possible to provide a specific option, such as a finisher to sort printed sheet materials or an auto document feeder (ADF) to automatically feed a document.

Next, a hardware configuration of the operating unit 20 will be described. As illustrated in FIG. 2, the operating unit 20 includes a CPU 21, a ROM 22, a RAM 23, a flash memory 24, a communication I/F 25, a connection I/F 26, and an operation panel 27, which are coupled to one another via a system bus 28.

The CPU 21 integrally controls operations performed by the operating unit 20. The CPU 21 executes a program stored in the ROM 22, the flash memory 24, or the like by using the RAM 23 as a work area (workspace), to thereby control the entire operation of the operating unit 20 and implement various functions, such as display of information (image) corresponding to an input accepted from a user, which will be described later.

The communication I/F 25 is an interface for connecting to the network 8. The connection I/F 26 is an interface for communicating with the main body 10 via the communication channel 30.

The operation panel 27 accepts various inputs according to operations performed by the user, and displays various kinds of information (for example, information corresponding to an accepted operation, information indicating an operation status of the MFP 1, information indicating a setting state, or the like). In this example, the operation panel 27 is configured with a liquid crystal display (LCD) with a touch panel function; however, it is not limited thereto. For example, the operation panel 27 may be configured with an organic electroluminescent (EL) display with a touch panel function. Furthermore, additionally or alternatively, an operating unit, such as a hardware key, or a display unit, such as a lamp, may be provided.

A software configuration of the MFP 1 will be described below. FIG. 3 is a schematic diagram illustrating an example of the software configuration of the MFP 1. As illustrated in FIG. 3, the main body 10 includes an application layer 101, a service layer 102, and an operating system (OS) layer 103. The substances of the application layer 101, the service layer 102, and the OS layer 103 are various kinds of software stored in the ROM 12, the HDD 14, or the like. The CPU 11 executes the various kinds of software to provide various functions.

The software of the application layer 101 is application software (may be simply referred to as an "application" in the following descriptions) for operating a hardware resource and providing a predetermined function. Examples of the application include a copy application for providing a copy function, a scanner application for providing a scanner function, a facsimile application for providing a facsimile function, and a printer application for providing a printer function.

The software of the service layer 102 is software that is provided between the application layer 101 and the OS layer 103 and that provides, to an application, an interface for using a hardware resource included in the main body 10. More specifically, the software is software for providing a function to accept an operation request with respect to a hardware resource and a function to arbitrate the operation request. The operation request accepted by the service layer 102 may be a request for reading by the scanner, a request for printing by the plotter, or the like.

Incidentally, the interface function of the service layer 102 is provided not only to the application layer 101 of the main body 10 but also to an application layer 201 of the operating unit 20. That is, the application layer 201 (application) of the operating unit 20 can implement a function using a hardware resource (for example, the engine 17) of the main body 10 via the interface function of the service layer 102.

The software of the OS layer 103 is basic software (OS) for providing a basic function to control hardware included in the main body 10. The software of the service layer 102 converts a request for use of a hardware resource from various applications into a command that the OS layer 103 can interpret, and sends the command to the OS layer 103. The software of the OS layer 103 executes the command, and the hardware resource performs an operation in accordance with the request from the application.

Similarly, the operating unit 20 includes the application layer 201, a service layer 202, and an OS layer 203. A hierarchical structure of the application layer 201, the service layer 202, and the OS layer 203 of the operating unit 20 is the same as that of the main body 10. However, functions provided by an application of the application layer 201 and variations of an operation request that can be accepted by the service layer 202 are different from those of the main body 10. The application of the application layer 201 is software for mainly providing a function of a user interface (UI) to perform an operation or display related to a function of the main body 10 (the copy function, the scanner function, the facsimile function, or the printer function), but may be software for operating a hardware resource of the operating unit 20 and providing a predetermined function. The application of the application layer 201 also includes a browser application (store application), an installation application, and the like.

Incidentally, in the first embodiment, to maintain the independency of the functions, the software of the OS layer 103 of the main body 10 and the software of the OS layer 203 of the operating unit 20 are different from each other. That is, the main body 10 and the operating unit 20 independently operate by different operating systems. For example, it may be possible to use Linux (registered trademark) as the software of the OS layer 103 of the main body 10, and use Android (registered trademark) as the software of the OS layer 203 of the operating unit 20.

As described above, in the MFP 1 of the first embodiment, the main body 10 and the operating unit 20 operate by different operating systems. Therefore, communication between the main body 10 and the operating unit 20 is performed as communication between different devices, rather than inter-process communication in a common device. The communication corresponds to an operation (command communication) of sending information (a content of an instruction from a user) accepted by the operating unit 20 to the main body 10, an operation of notifying the operating unit 20 of an event by the main body 10, or the like. Here, the operating unit 20 can use the functions of the main body 10 by performing the command communication with the main body 10. Furthermore, the event notified to the operating unit 20 by the main body 10 includes an operation execution status in the main body 10, contents set by the main body 10, and the like.

Moreover, in the first embodiment, power is supplied to the operating unit 20 from the main body 10 through the communication channel 30. Therefore, it is possible to control the power of the operating unit 20 separately from (independently of) control of power of the main body 10.

Next, functions included in the MFP 1 will be described. FIG. 4 is a diagram illustrating an example of the functions included in the MFP 1. As illustrated in FIG. 4, the MFP 1 includes a login screen display unit 111, an authenticating unit 112, an operation screen display unit 113, an acquiring unit 114, a first specifying unit 115, a first display unit 116, an introduction control unit 117, and a registering unit 118. For convenience of description, the functions according to the present invention are mainly illustrated in FIG. 4. However, the functions included in the MFP 1 are not limited to this example.

The login screen display unit 111 displays, on the operation panel 27, a login screen to prompt an input of first user information used for authentication of determining whether a user has an authority to use the MFP 1, and accepts an input of the first user information. In this example, the first user information is configured as a combination of a user ID and a password; however, it is not limited thereto.

When the above-described first user information is accepted (in this example, when the login screen display unit 111 accepts an input of the first user information), the authenticating unit 112 performs the authentication by comparing the first user information and second user information identifying a user who has an authority to use the MFP 1. Here, the authentication is to determine that the user who has input the first user information has the authority to use the MFP 1 when the first user information and the second user information match each other, and determine that the user who has input the first user information does not have the authority to use the MFP 1 when the first user information and the second user information do not match each other.

In the first embodiment, the authenticating unit 112 holds entry information illustrated in FIG. 5 for each user who has the authority to use the MFP 1. As items of the entry information, an entry ID for identifying the entry information, a user ID, a password, and a belonging group are included. In this example, a combination of the user ID and the password (a combination of a value corresponding to the user ID and a value corresponding to the password) in the entry information corresponds to the second user information identifying a user who has the authority to use the MFP 1. Furthermore, the belonging group in the entry information is an item indicating an administrator group to which the user belongs. For example, if a value corresponding to the belonging group indicates a "device administrator group", a device administrator function is set as a function that the user is authorized to use. Furthermore, for example, if the value corresponding to the belonging group indicates a "user administrator group", a user administrator function is set as a function that the user is authorized to use. Thus, it can be considered that the belonging group (the value corresponding to the belonging group) corresponds to function information indicating a function available to the user.

That is, it can be considered that the entry information is information, in which the second user information identifying the user who has the authority to use the MFP 1 is associated in advance with function information indicating a function that the user identified by the second user information is authorized to use. Furthermore, it can be considered that a set of pieces of the entry information set for a plurality of users is information, in which each piece of the second user information is associated in advance with function information indicating a function that a user identified by each piece of the second user information is authorized to use. Here, it can be considered that a single piece of the entry information corresponds to "second information" in the appended claims, or a set of the pieces of the entry information set for a plurality of users corresponds to the "second information" in the appended claims.

In the first embodiment, when an input of a user ID and a password is accepted as the above-described first user information, and if the entry information including a combination of a user ID and a password that matches the accepted combination of the user ID and the password is present (in other words, when the first user information and the second user information match each other), the authenticating unit 112 determines that the user who has input the first user information has the authority to use the MFP 1. That is, the authenticating unit 112 authenticates the user.

Furthermore, in the first embodiment, the authenticating unit 112 holds third information, in which each of functions is associated with condition information in advance, where the condition information indicates whether a state in which the user has an authority to use the function is used as a condition for granting an authority that is associated with the function in advance. FIG. 6 is a diagram illustrating an example of the third information. The third information illustrated in FIG. 6 is information in which a value indicating the condition information is associated with each of items that have one-to-one correspondence with a plurality of functions. In the example in FIG. 6, a device administrator function setting corresponds to the device administrator function, a user administrator function setting corresponds to the user administrator function, a document administrator function setting corresponds to a document administrator function, a network administrator function setting corresponds to a network administrator function, and a service function setting corresponds to a service setting. As illustrated in FIG. 6, a value corresponding to the device administrator function setting indicates "enabled", which indicates that a state in which the user has an authority to use the device administrator function is used as a condition for granting an authority that is associated with the device administrator function in advance. That is, as long as the user does not have the authority to use the device administrator function, the authority that is associated with the device administrator function in advance is not granted. The same applies to the user administrator function setting, the document administrator function setting, and the service function setting.

Furthermore, as illustrated in FIG. 6, a value corresponding to the network administrator function setting indicates "disabled", which indicates that a state in which the user has an authority to use the network administrator function is not used as a condition for granting an authority that is associated with the network administrator function in advance. That is, the authority associated with the network administrator function is granted even when the user does not have the authority to use the network administrator function.

Moreover, in the first embodiment, the authenticating unit 112 holds fourth information, in which each of functions is associated with one or more authorities in advance. FIG. 7 is a diagram illustrating an example of the fourth information. In the example in FIG. 7, the device administrator function is associated with an authority, such as an installation authority indicating an authority to install (introduce) an application in the MFP 1, and the user administrator function is associated with authorities, such as an address book edit authority indicating an authority to edit an address book (user entries), a function restriction setting authority indicating an authority to perform setting of whether to restrict a function, such as color printing, for each user, and an authentication setting authority indicating an authority to set an authentication method (an authority to set whether authentication is enabled or disabled, or an authority to set basic authentication or Kerberos authentication). Specific methods of using the pieces of the above-described information (the entry information (second information), the third information, and the fourth information) will be described later. The authenticating unit 112 holds the entry information, the third information, and the fourth information in this example; however, it is not limited thereto. For example, it may be possible to separately provide storage devices that respectively store the entry information, the third information, and the fourth information.

Description is continued with reference to FIG. 4. The operation screen display unit 113 displays an operation screen for performing various operations on the operation panel 27. More specifically, the operation screen display unit 113 displays an operation screen as illustrated in FIG. 8 on the operation panel 27 upon accepting a notice indicating that the user is authenticated from the authenticating unit 112, and displays, for example, a screen indicating an authentication failure on the operation panel 27, instead of displaying the operation screen on the operation panel 27, upon accepting a notice indicating that the user is not authenticated. FIG. 8 is a diagram illustrating an example of the operation screen. An icon 4 for activating the store application is displayed on the operation screen.

Description is continued with reference to FIG. 4. The acquiring unit 114 acquires the application list screen (in this example, the application store), in which each of applications is associated with display information (in this example, an install button 5 to be described later) for giving an instruction to introduce an application in the MFP 1 in accordance with an operation performed by the user (logged-in user) authenticated by the authenticating unit 112. In the first embodiment, when the user touches the icon 4, the store application is activated, and the store application (the acquiring unit 114) transmits a signal for requesting the application store (hereinafter, may be referred to as an "application store request") to the application store server 2. In response to the request, the application store is acquired from the application store server 2.

FIG. 9 is a diagram illustrating an example of the application store acquired from the application store server 2 (the application store before being displayed on the MFP 1). In the example in FIG. 9, the application store displays, for each of applications, description information for describing contents of an application and the button 5 (hereinafter, referred to as the "install button 5") for giving an instruction to install the application in the MFP 1. In this example, a command to cause the installation application to install an application (hereinafter, referred to as an "installation command") is attached, in a uniform resource identifier (URI) format (for example, a uniform resource locator (URL)

format is available), to the install button 5 corresponding to the application. FIG. 10 is a diagram illustrating an example of the installation command that is attached to the install button 5 corresponding to an application identified by an ID of "49354" and that indicates a command to install the application identified by the ID of "49354".

Furthermore, in this example, in a page response for the above-described application store request, a script is embedded such that the install button 5 is displayed when the logged-in user has the installation authority and the install button 5 is hidden when the logged-in user does not have the installation authority.

Description is continued with reference to FIG. 4. When the acquiring unit 114 acquires the application list screen (in this example, the application store), the first specifying unit 115 specifies authority information corresponding to the second user information identifying the user authenticated by the authenticating unit 112, based on first information indicating a correspondence relation between the second user information and the authority information indicating an authority given to the user identified by the second user information.

In the first embodiment, it can be considered that the above-described first information includes the above-described entry information, the above-described third information, and the above-described fourth information. The first specifying unit 115 specifies, as authority information (authority information on the logged-in user) corresponding to the second user information identifying the user authenticated by the authenticating unit 112, information indicating an authority that is associated with a function that matches the function indicated by the function information associated with the second user information identifying the user authenticated by the authenticating unit 112 in the above-described entry information, among the authorities included in the above-described fourth information. Furthermore, the first specifying unit 115 specifies, as authority information corresponding to the second user information identifying the user authenticated by the authenticating unit 112, information indicating an authority that is associated with a function that matches the function associated with the condition information indicating that the state in which the user has the authority is not used as the condition for granting the authority that is associated with the function in the above-described third information, among the authorities included in the above-described fourth information.

Further details will be described below. In the first embodiment, when the acquiring unit 114 acquires the application store, the first specifying unit 115 requests the authenticating unit 112 to provide function restriction information, in which restriction/no-restriction information indicating whether the use by the logged-in user is restricted (whether the logged-in user has an authority to use a corresponding function) is associated with each of functions, and to provide the above-described third information and the above-described fourth information. Upon receiving the request, the authenticating unit 112 specifies entry information including the second user information (in this example, the combination of the user ID and the password) identifying the logged-in user, refers to a value corresponding to the belonging group in the specified entry information, and generates the function restriction information. For example, it is assumed that the specified entry information is configured as illustrated in FIG. 11. In the example in FIG. 11, the value corresponding to the belonging group indicates the "device administrator group", and the device administrator function is set as a function that the user identified by the combination of the user ID and the password in the specified entry information is authorized to use. Therefore, the authenticating unit 112 can generate the function restriction information as illustrated in FIG. 12. In the example in FIG. 12, it is indicated that the device administrator function is not restricted. That is, it is indicated that the logged-in user has an authority to use the device administrator function. Furthermore, in the example in FIG. 12, it is indicated that the other functions, such as the user administrator function, are restricted. That is, it is indicated that the logged-in user does not have authorities to use the other functions.

The authenticating unit 112 transmits the function restriction information generated as above, the above-described third information, and the above-described fourth information to the first specifying unit 115.

The embodiment is not limited to the above-described examples. For example, the first specifying unit 115 may acquire the entry information including the second user information identifying the logged-in user from the authenticating unit 112 instead of the function restriction information, or may acquire all pieces of the entry information (a plurality of pieces of the entry information having one-to-one correspondence with a plurality of users) from the authenticating unit 112. This is because it is possible to determine whether the use of each of the functions by the logged-in user is restricted as long as the entry information is acquired.

In the following, as one example, it is assumed that the first specifying unit 115 acquires the function restriction information illustrated in FIG. 12, the third information illustrated in FIG. 6, and the fourth information illustrated in FIG. 7. In the example in FIG. 12, it is indicated that the device administrator function is not restricted. Therefore, the first specifying unit 115 specifies the device administrator function as a function indicated by the function information associated with the second user information identifying the logged-in user. Furthermore, while the other functions are restricted in the example in FIG. 12, the value corresponding to the network administrator function setting in the third information illustrated in FIG. 6 indicates "disabled", so that an authority that is associated with the network administrator function in advance is granted even when the logged-in user does not have an authority to use the network administrator function. Therefore, the first specifying unit 115 specifies the network administrator function as a function associated with the condition information indicating that the state in which the user has the authority is not used as the condition for granting the authority that is associated with the function in the above-described third information.

Subsequently, the first specifying unit 115 specifies, as the authority information on the logged-in user, information indicating an authority associated with the device administrator function and information indicating an authority associated with the network administrator function specified as above, among the authorities included in the fourth information illustrated in FIG. 7. As can be understood in FIG. 7, in this example, the installation authority indicating an authority to install an application in the MFP 1 is associated with the device administrator function. Therefore, the authority indicated by the authority information on the logged-in user includes the installation authority.

Description is continued by referring back to FIG. 4. The first display unit 116 changes a display content of the application list screen (in this example, the application store) and displays the changed content, in accordance with the authority information specified by the first specifying unit 115. More specifically, if the authority indicated by the authority information specified by the first specifying unit 115 does not include an authority to introduce an application in the MFP 1, the first display unit 116 displays an application list screen in which the display information is hidden. For example, if the authority indicated by the authority information specified by the first specifying unit 115 does not include the installation authority, the first display unit 116 displays an application store as illustrated in FIG. 13, in which the install buttons 5 are hidden, on the operation panel 27.

In contrast, if the authority indicated by the authority information specified by the first specifying unit 115 includes an authority to introduce an application in the MFP 1, the first display unit 116 displays an application store in which the install buttons 5 are displayed.

FIG. 14 is a flowchart illustrating an example of an operation performed by the MFP 1 from acquisition to display of the application store. First, the acquiring unit 114 acquires the application store from the application store server 2 in accordance with an operation performed by the logged-in user (Step S1). Subsequently, the first specifying unit 115 specifies the authority information on the logged-in user based on the above-described first information (Step S2). Detailed operations are the same as described above. Then, the first display unit 116 checks whether the authority indicated by the authority information on the logged-in user (the authority information specified at Step S2) includes the installation authority (Step S3).

If the authority indicated by the authority information on the logged-in user does not include the installation authority (NO at Step S3), the first display unit 116 displays the application store in which the install buttons 5 are hidden on the operation panel 27 (Step S4). In contrast, if the authority indicated by the authority information on the logged-in user includes the installation authority (YES at Step S3), the first display unit 116 displays the application store acquired at Step S1 as it is on the operation panel 27 (Step S5).

Description is continued by referring back to FIG. 4. The introduction control unit 117 introduces an application in the MFP 1 in accordance with an instruction given by a user who is authenticated by the authenticating unit 112 and who has the authority to introduce an application in the MFP 1. In this example, if a user who is authenticated by the authenticating unit 112 and who has the authority to introduce an application in the MFP 1 presses the install button 5 of any of applications on the application store (may be regarded as an instruction to install the application in the MFP 1), the browser application notifies the OS in the operating unit 20 of the installation command attached to the install button 5. The OS in the operating unit 20 checks the notified installation command, and broadcasts the installation command to each of applications in the operating unit 20. Then, the installation application (the introduction control unit 117) responds to the broadcast installation command, sends a request for downloading of an application identified by an ID included in the installation command to the application server 3, and downloads the application form the application server 3. Then, the downloaded application is installed in the MFP 1.

For example, the application downloaded from the application server 3 is provided by an archive file as illustrated in FIG. 15, and includes a main body of the application and an associated information file. The information file includes a product ID for identifying the application, a version, information on a condition of the MFP 1 needed to operate the application, or the like. In this example, information needed to manage the application is extracted from the information included in the information file, and recorded in fifth information to be described later.

Description is continued by referring back to FIG. 4. Every time the introduction control unit 117 introduces an application in the MFP 1, the registering unit 118 registers the introduced application and the authority information on a user who has given an instruction to introduce the application in an associated manner in the fifth information, in which each of applications already introduced in the MFP 1 is associated with the authority information on the user who has given the instruction to introduce the application. For example, at the time of installation, the introduction control unit 117 may acquire the above-described function restriction information, the above-described third information, and the above-described fourth information from the authenticating unit 112 and specify the authority information on the logged-in user in the same manner as the above-described first specifying unit 115, or may send a request for the authority information on the logged-in user to the above-described first specifying unit 115 and acquire the authority information on the logged-in user in response to the request.

FIG. 16 is a diagram illustrating an example of the fifth information. In the example in FIG. 16, the fifth information includes a plurality of pieces of application information having one-to-one correspondence with a plurality of applications already installed in the MFP 1. Each piece of the application information includes information for identifying a corresponding application (a product ID, an application name, a version, a type, a license unique ID for identifying a license, and an activation state indicating whether a use start setting is enabled), and authority information on the user who has given an instruction to install the corresponding application.

Next, configurations of the application store server 2 and the application server 3 will be described. FIG. 17 is a diagram illustrating an example of a hardware configuration of the application store server 2. Incidentally, a hardware configuration of the application server 3 is the same as the configuration illustrated in FIG. 17.

As illustrated in FIG. 17, the application store server 2 includes a CPU 301, a ROM 302, a RAM 303, a communication I/F 304, an input device 305, and a display device 306. The CPU 301 integrally controls operations performed by the application store server 2. The ROM 302 is a non-volatile memory for storing various kinds of data, such as a program. The RAM 303 is a volatile memory that functions as a workspace (work area) for various processes performed by the CPU 301. The communication I/F 304 is an interface for connecting to the network 8. The input device 305 is a device used to input an operation by a user, and is configured with, for example, a mouse, a keyboard, or the like. The display device 306 is a device that displays various kinds of information, and is configured with, for example, a display device of a liquid crystal display type.

FIG. 18 is a diagram illustrating an example of functions included in the application store server 2. As illustrated in FIG. 18, the application store server 2 includes an application store holding unit 211 and an application store transmitting unit 212. For convenience of description, the functions according to the present invention are mainly illustrated in FIG. 18. However, the functions included in the application store server 2 are not limited to this example.

The application store holding unit 211 holds the above-described application store. Upon receiving the above-described application store request from the MFP 1, the application store transmitting unit 212 transmits the application store held in the application store holding unit 211 to the MFP 1 in response to the request.

FIG. 19 is a diagram illustrating an example of functions included in the application server 3. As illustrated in FIG. 19, the application server 3 includes an application holding unit 311 and an application transmitting unit 312. For convenience of description, in FIG. 19, the functions according to the present invention are mainly illustrated. However, the functions included in the application server 3 are not limited to this example.

The application holding unit 311 holds a plurality of applications. The application transmitting unit 312 transmits an application held in the application holding unit 311 to the MFP 1 in response to a request (download request) from the MFP 1.

FIG. 20 is a sequence diagram illustrating an example of the flow of an operation performed by the information processing system 100 of the first embodiment. First, the above-described login screen is displayed on the operation panel 27, and if a user inputs the first user information (for example, a user ID and a password) in the login screen (Step S11), the authenticating unit 112 performs the above-described authentication (Step S12). If a result of the authentication is positive, the operation screen illustrated in FIG. 8 is displayed on the operation panel 27. If the result of the authentication is negative, an error screen indicating that authentication has failed (the use of the MFP 1 is not permitted) is displayed on the operation panel 27. In the following descriptions, it is assumed that the result of the authentication is positive.

Subsequently, if the logged-in user touches the icon 4 on the operation screen (see FIG. 8) (Step S13), the browser application transmits the above-described application store request to the application store server 2 (Step S14).

In response to the request, the browser application receives an application store from the application store server 2 (Step S15), and performs a process according to a script embedded in the response. More specifically, the following process is performed. First, the browser application (the first specifying unit 115) requests the authenticating unit 112 to provide the above-described function restriction information, the above-described third information, and the above-described fourth information (Step S16), and acquires, as a response, the above-described function restriction information, the above-described third information, and the above-described fourth information (Step S17). Then, the browser application (the first specifying unit 115) specifies authority information on the logged-in user from the above-described function restriction information, the above-described third information, and the above-described fourth information (Step S18). Detailed operations are the same as described above. Subsequently, the browser application (the first display unit 116) changes a display content of the application store received at Step S15 and displays the changed content in accordance with the authority information specified at Step S18 (Step S19).

Here, an example will be described in which an authority indicated by the authority information specified at Step S18 described above includes the installation authority, that is, the application store in which the install buttons 5 are displayed is displayed on the operation panel 27 at Step S19 described above. If the user presses the install button 5 of any of applications on the application store (Step S20), the browser application notifies the OS in the operating unit 20 of an installation command attached to the install button 5 (Step S21). The OS in the operating unit 20 checks the notified installation command (Step S22), and broadcasts the installation command to each of applications in the operating unit 20 (Step S23).

Then, the installation application (the introduction control unit 117) responds to the broadcast installation command, sends a request for downloading of an application identified by an ID included in the installation command to the application server 3 (Step S24), and downloads the application from the application server 3 (Step S25). Then, the downloaded application is installed in the MFP 1 (Step S26).

Furthermore, the installation application (the introduction control unit 117) requests the authenticating unit 112 to provide the above-described function restriction information, the above-described third information, and the above-described fourth information (Step S27), and acquires, as a response, the above-described function restriction information, the above-described third information, and the above-described fourth information (Step S28). Then, the installation application specifies the authority information on the logged-in user from the above-described function restriction information, the above-described third information, and the above-described fourth information (Step S29), and records the above-described application information, in which the specified authority information and the application installed at Step S26 are associated, in the above-described fifth information (Step S30).

As described above, in the first embodiment, the display content of the application store is changed and the changed content is displayed in accordance with the authority information on the logged-in user. For example, if the authority indicated by the authority information on the logged-in user does not include the installation authority, the application store in which the install buttons 5 are hidden is displayed, and, if the authority indicated by the authority information on the logged-in user includes the installation authority, the application store in which the install buttons 5 are displayed is displayed. That is, it is possible to provide the application store in a mode according to the authority given to the logged-in user, so that it is possible to improve the convenience of the user.

Furthermore, as described above, the MFP 1 of the first embodiment has the first information indicating a correspondence relation between the second user information identifying the user who has the authority to use the MFP 1 and the authority information indicating an authority given to the user identified by the second user information, and can specify the authority information on the logged-in user based on the first information. Therefore, for example, if a user is to install an application, it is necessary to perform authentication of determining whether the user has the authority to use the MFP 1, but it is not necessary to perform authentication of determining whether the user has the installation authority. Therefore, it is not necessary to request the user to input information needed to authenticate the installation authority. That is, according to the first embodiment, it is possible to reduce the number of times of authentication, which further improves the convenience of the user.

Second Embodiment

A second embodiment will be described below. Explanation of the same components as those of the above-described first embodiment will be omitted appropriately. FIG. 21 is a diagram illustrating an example of functions included in an MFP 1 of the second embodiment. As illustrated in FIG. 21, the MFP 1 is different from that of the above-described first embodiment in that it further includes a second specifying unit 121, a third specifying unit 122, and a second display unit 123.

The second specifying unit 121, upon accepting an operation of requesting an update screen for giving an instruction to update an application from a user (logged-in user) authenticated by the authenticating unit 112, specifies authority information corresponding to the second user information identifying the user. The specification method here is the same as the specification method used by the above-described first specifying unit 115. Incidentally, it may be possible to cause the first specifying unit 115 to also function as the second specifying unit 121.

The third specifying unit 122 specifies, in the above-described fifth information, an application associated with authority information that matches the authority information specified by the second specifying unit 121. More specifically, the third specifying unit 122 specifies one or more pieces of the application information including the authority information that matches the authority information specified by the second specifying unit 121 from among pieces of the application information included in the above-described fifth information, and specifies one or more applications having one-to-one correspondence with one or more pieces of the specified application information.

The second display unit 123 displays the update screen for giving an instruction to update the application specified by the third specifying unit 122. FIG. 22 is a diagram illustrating an example of the update screen displayed on the operation panel 27. The update screen displays only applications installed by the logged-in user, and the user performs an operation of selecting any of the applications and pressing a software key "update" in order to give an instruction to update the selected application.

In the second embodiment, the applications displayed on the above-described update screen are limited to the applications that can be updated by the logged-in user. Therefore, it is possible to prevent a situation, in which an application installed by a different administrator is updated by mistake.

FIG. 23 is a flowchart illustrating an example of an operation performed by the MFP 1 of the second embodiment. As illustrated in FIG. 23, upon accepting an operation of requesting the update screen from the logged-in user (YES at Step S41), the second specifying unit 121 specifies authority information on the logged-in user (Step S42). Subsequently, the third specifying unit 122 specifies, in the above-described fifth information, an application associated with authority information that matches the authority information specified at Step S42 described above (Step S43). Then, the second display unit 123 displays the update screen for giving an instruction to update the application specified at Step S43 described above (Step S44).

Third Embodiment

A third embodiment will be described below. Explanation of the same components as those of the above-described embodiments will be omitted appropriately. FIG. 24 is a diagram illustrating an example of functions included in an MFP 1 of the third embodiment. As illustrated in FIG. 24, the MFP 1 is different from that of the first embodiment in that it further includes a fourth specifying unit 124, a fifth specifying unit 125, and a third display unit 126.

The fourth specifying unit 124, upon accepting an operation of requesting a deletion screen for giving an instruction to delete (uninstall) an application from a user (logged-in user) authenticated by the authenticating unit 112, specifies authority information corresponding to the second user information identifying the user. The specification method here is the same as the specification method used by the above-described first specifying unit 115. Incidentally, it may be possible to cause the first specifying unit 115 to also function as the fourth specifying unit 124.

The fifth specifying unit 125 specifies, in the above-described fifth information, an application associated with authority information that matches the authority information specified by the fourth specifying unit 124. More specifically, the fifth specifying unit 125 specifies one or more pieces of the application information including the authority information that matches the authority information specified by the fourth specifying unit 124 from among pieces of the application information included in the above-described fifth information, and specifies one or more applications having one-to-one correspondence with one or more pieces of the specified application information.

The third display unit 126 displays the deletion screen for giving an instruction to delete the application specified by the fifth specifying unit 125. FIG. 25 is a diagram illustrating an example of the deletion screen displayed on the operation panel 27. The deletion screen displays only applications installed by the logged-in user, and the user performs an operation of selecting any of the applications and pressing a software key "uninstall" in order to give an instruction to delete the selected application.

In the third embodiment, the applications displayed on the above-described deletion screen are limited to the applications that can be deleted by the logged-in user. Therefore, it is possible to prevent a situation, in which an application installed by a different administrator is deleted by mistake.

FIG. 26 is a flowchart illustrating an example of an operation performed by the MFP 1 of the third embodiment. As illustrated in FIG. 26, upon accepting an operation of requesting the deletion screen from the logged-in user (YES at Step S51), the fourth specifying unit 124 specifies authority information on the logged-in user (Step S52). Subsequently, the fifth specifying unit 125 specifies, in the above-described fifth information, an application associated with authority information that matches the authority information specified at Step S52 as described above (Step S53). Then, the third display unit 126 displays the deletion screen for giving an instruction to delete the application specified at Step S53 as described above (Step S54).

While the embodiments of the present invention have been explained above, the present invention is not limited to the embodiments as they are, and may be embodied by modifying components within the scope of the invention. Furthermore, various modifications may be made by appropriately combining a plurality of components described in the embodiments. For example, it may be possible to remove some components from all of the components described in the embodiments. Moreover, the components described in the different embodiments may be combined appropriately.

The functions of each of the units of the MFP 1 as described above (the login screen display unit 111, the authenticating unit 112, the operation screen display unit 113, the acquiring unit 114, the first specifying unit 115, the first display unit 116, the introduction control unit 117, the registering unit 118, the second specifying unit 121, the third specifying unit 122, the second display unit 123, the fourth specifying unit 124, the fifth specifying unit 125, and the third display unit 126) are implemented by causing the CPU (11 or 21) to execute a program stored in a storage device (for example, the ROM 12, HDD 14, the ROM 22, a flash memory 24, or the like); however, it is not limited thereto.

For example, it may be possible to implement at least a part of the functions of each of the units of the above-described MFP 1 by a special hardware circuit (for example, a semiconductor integrated circuit or the like).

Furthermore, in the above-described embodiments, the main body 10 and the operating unit 20 separately operate by using different operating systems; however, it is not limited thereto. For example, the main body 10 and the operating unit 20 may operate by using the same operating system.

Moreover, in the above-described embodiments, the above-described first information is configured as a combination of the above-described entry information (second information), the above-described third information, and the above-described fourth information; however, it is not limited thereto. For example, the above-described first information may be configured with information, in which each of one or more pieces of the second user information is associated with authority information indicating an authority given to a user identified by each piece of the second user information. Namely, it is sufficient that the above-described first information is information indicating (capable of specifying) a correspondence relation between the second user information and the authority information indicating the authority given to the user identified by the second user information.

Furthermore, the program executed by the information processing system 100 (the MFP 1, the application store server 2, the application server 3, and the like) of the above-described embodiments may be provided by being recorded in a computer-readable recording medium, such as a compact disc-read only memory (CD-ROM), a flexible disk (FD), a compact disc-recordable (CD-R), a digital versatile disk (DVD), or a universal serial bus (USB), in a computer-installable or a computer-executable file or the like, or may be provided or distributed via a network, such as the Internet. Moreover, various programs may be provided by being incorporated in a ROM or the like in advance.

REFERENCE SIGNS LIST

1 MFP
2 Application store server
3 Application server
8 Network
10 Main body
20 Operating unit
100 Information processing system
111 Login screen display unit
112 Authenticating unit
113 Operation screen display unit
114 Acquiring unit
115 First specifying unit
116 First display unit
117 Introduction control unit
118 Registering unit
121 Second specifying unit
122 Third specifying unit
123 Second display unit
124 Fourth specifying unit
125 Fifth specifying unit
126 Third display unit
211 Application store holding unit
212 Application store transmitting unit
311 Application holding unit
312 Application transmitting unit

CITATION LIST

Patent Literature

PTL 1: Japanese Unexamined Patent Application Publication No. 2011-237881

The invention claimed is:

1. An information processing apparatus comprising:
   memory storing computer-readable instructions; and
   one or more processors configured to execute the computer-readable instructions such that the one or more processors are configured to perform operations including,
   comparing, when accepting first user information used for authentication of determining whether a user has an authority to use the information processing apparatus, the first user information and second user information identifying a user who has the authority to use the information processing apparatus so as to perform the authentication;
   acquiring an application list screen, in which each application is associated with display information including an install button configured to install the application in the information processing apparatus, in accordance with an operation performed by an authenticated user;
   when acquiring the application list screen, specifying authority information corresponding to the second user information identifying the authenticated user, based on first information indicating a correspondence relation between the second user information and the authority information indicating an authority given to the user identified by the second user information;
   displaying content of the application list screen including the install button when the authority indicated by the authority information includes an authority to install the application in the information processing apparatus and when the authority indicated by the authority information does not include an authority to install the application in the information processing apparatus, the one or more processors cause display of the content of the application list screen and cause the install button to be hidden from display, wherein the information processing apparatus includes at least one of a printer and a scanner;
   when accepting an operation of requesting an update screen for giving an instruction to update an application from a user authenticated, specify the authority information corresponding to the second user information identifying the user;
   specifying an application associated with the authority information that matches the specified authority information;
   when accepting an operation of requesting a deletion screen for giving an instruction to delete an application from a user authenticated, specify the authority information corresponding to the second user information identifying the user; and
   displaying the update screen for giving an instruction to update the specified application.

2. The information processing apparatus according to claim 1, wherein the first information includes
   second information, in which the second user information is associated with function information indicating a function that the user identified by the second user information is authorized to use, third information, in which each of functions is associated with condition information, the condition information indicating whether a state in which the user has an authority to use the function is used as a condition for granting an authority that is associated with the function in advance, and fourth information, in which each of the functions is associated with one or more authorities in advance.

3. The information processing apparatus according to claim 2, wherein the one or more processors specify, as the authority information corresponding to the second user information identifying the user authenticated, information indicating an authority associated with a function that matches a function indicated by the function information associated with the second user information identifying the user authenticated in the second information, among the authorities included in the fourth information.

4. The information processing apparatus according to claim 2, wherein the one or more processors specify, as the authority information corresponding to the second user information identifying the user authenticated, information indicating an authority associated with a function that matches a function that is associated with the condition information indicating that the state in which the user has the authority is not used as the condition for granting the authority that is associated with the function in the third information, among the authorities included in the fourth information.

5. The information processing apparatus according to claim 1, wherein the one or more processors are:

configured to introduce an application in the information processing apparatus in accordance with an instruction given by a user who is authenticated and who has an authority to introduce an application in the information processing apparatus; and configured to, every time an application is introduced in the information processing apparatus, register the introduced application and the authority information on a user who has given an instruction to introduce the application in an associated manner in fifth information, in which each of applications already introduced in the information processing apparatus is associated with the authority information on the user who has given the instruction to introduce the application.

6. The information processing apparatus according to claim 5, wherein the one or more processors are:

configured to specify, in the fifth information, an application associated with the authority information that matches the specified authority information specified; and configured to display the deletion screen for giving an instruction to delete the specified application.

7. An information processing method comprising:

comparing, when accepting first user information used for authentication of determining whether a user has an authority to use an information processing apparatus, the first user information and second user information identifying a user who has the authority to use the information processing apparatus so as to perform the authentication;

acquiring an application list screen, in which each of applications is associated with display information including an install button configured to install the application in the information processing apparatus, in accordance with an operation performed by a user authenticated at the authenticating;

specifying, when the application list screen is acquired at the acquiring, authority information corresponding to the second user information identifying the user authenticated at the authenticating, based on first information indicating a correspondence relation between the second user information and the authority information indicating an authority given to the user identified by the second user information;

displaying content of the application list screen including the install button when the authority indicated by the authority information includes an authority to install the application in the information processing apparatus and when the authority indicated by the authority information does not include an authority to install the application in the information processing apparatus, hiding the install button from display, wherein the information processing apparatus includes at least one of a printer and a scanner;

when accepting an operation of requesting an update screen for giving an instruction to update an application from a user authenticated, specify the authority information corresponding to the second user information identifying the user;

specifying an application associated with the authority information that matches the specified authority information;

when accepting an operation of requesting a deletion screen for giving an instruction to delete an application from a user authenticated, specify the authority information corresponding to the second user information identifying the user; and displaying the update screen for giving an instruction to update the specified application.

8. A non-transitory computer-readable storage medium storing a program which, when executed by one or more processors, cause the one or processors to execute:

comparing, when accepting first user information used for authentication of determining whether a user has an authority to use an information processing apparatus, the first user information and second user information identifying a user who has an authority to use the information processing apparatus so as to perform the authentication;

acquiring an application list screen, in which each of applications is associated with display information including an install button configured to install the application in the information processing apparatus, in accordance with an operation performed by a user authenticated at the authenticating;

specifying, when the application list screen is acquired at the acquiring, authority information corresponding to the second user information identifying the user authenticated at the authenticating, based on first information indicating a correspondence relation between the second user information and the authority information indicating an authority given to the user identified by the second user information;

displaying content of the application list screen including the install button when the authority indicated by the authority information includes an authority to install the application in the information processing apparatus and when the authority indicated by the authority information does not include an authority to install the application in the information processing apparatus, hiding the install button from display, wherein the information processing apparatus includes at least one of a printer and a scanner; and when accepting an operation of requesting an update screen for giving an instruction to update an application from a user authenticated, specify the authority information corresponding to the second user information identifying the user;

specifying an application associated with the authority information that matches the specified authority information;

when accepting an operation of requesting a deletion screen for giving an instruction to delete an application from a user authenticated, specify the authority information corresponding to the second user information identifying the user; and displaying the update screen for giving an instruction to update the specified application.

9. The information processing apparatus according to claim 1, wherein the information processing apparatus is a multifunction printer.

10. The information processing apparatus according to claim 1, wherein the one or more processors are configured to determine whether the authority information includes installation authority allowing a user to install an application from the list screen.

11. The information processing apparatus according to claim 1, wherein, after acquiring the application list screen, the one or more processors checks the authority of a currently logged-in user so as to switch between display and non-display of the install button.

* * * * *